(12) United States Patent
Breiholz et al.

(10) Patent No.: US 8,964,172 B1
(45) Date of Patent: Feb. 24, 2015

(54) MEANS TO DETECT DAMAGE IN COMPOSITE MATERIAL PANELS

(75) Inventors: Arlen E. Breiholz, Cedar Rapids, IA (US); Peter J. Morgan, Glenelg, MD (US); Thomas A. Potts, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 561 days.

(21) Appl. No.: 12/890,758

(22) Filed: Sep. 27, 2010

(51) Int. Cl.
| | | |
|---|---|---|
| G01N 21/00 | (2006.01) | |
| G01J 1/04 | (2006.01) | |
| G01J 1/42 | (2006.01) | |
| G01J 5/08 | (2006.01) | |
| G01M 11/08 | (2006.01) | |
| G01M 11/00 | (2006.01) | |
| G01L 1/24 | (2006.01) | |

(52) U.S. Cl.
CPC .......... *G01M 11/086* (2013.01); *G01M 11/083* (2013.01); *G01M 11/3136* (2013.01); *G01M 11/3109* (2013.01); *G01L 1/242* (2013.01)
USPC ................ 356/73.1; 250/227.14; 250/227.15; 250/227.16

(58) Field of Classification Search
None
See application file for complete search history.

(56) References Cited

U.S. PATENT DOCUMENTS

| | | | | |
|---|---|---|---|---|
| 4,603,252 A | * | 7/1986 | Malek et al. ............. | 250/227.14 |
| 4,629,318 A | * | 12/1986 | Malek et al. ............. | 356/237.1 |
| 4,692,610 A | * | 9/1987 | Szuchy ................. | 250/227.14 |
| 4,808,814 A | * | 2/1989 | Hofer et al. ............. | 250/227.15 |
| 4,836,030 A | * | 6/1989 | Martin .................... | 73/800 |
| 4,845,357 A | * | 7/1989 | Brennan ................. | 250/227.14 |
| 4,889,986 A | * | 12/1989 | Kersey et al. ........... | 250/227.19 |
| 4,927,232 A | * | 5/1990 | Griffiths ................. | 385/13 |
| 4,936,649 A | * | 6/1990 | Lymer et al. ........... | 385/13 |
| 5,013,908 A | * | 5/1991 | Chang .................... | 250/227.15 |
| 5,142,141 A | * | 8/1992 | Talat et al. ............. | 250/227.15 |
| 5,250,802 A | * | 10/1993 | Runner ................... | 250/227.15 |
| 5,299,271 A | * | 3/1994 | Hildebrand ............. | 385/12 |
| 5,568,582 A | * | 10/1996 | Rajic et al. ............. | 385/95 |
| 5,609,952 A | * | 3/1997 | Weiss .................... | 428/298.1 |
| 5,638,165 A | * | 6/1997 | Duke et al. ............. | 356/32 |
| 5,723,857 A | * | 3/1998 | Underwood et al. ..... | 250/227.14 |
| 6,075,628 A | * | 6/2000 | Fisher et al. ........... | 398/21 |
| 7,113,660 B2 | * | 9/2006 | Andrews et al. ........ | 385/13 |
| 8,194,238 B1 | * | 6/2012 | Hedger ................... | 356/73.1 |
| 2011/0075964 A1 | * | 3/2011 | Huffman ................. | 385/13 |

FOREIGN PATENT DOCUMENTS

DE 102007032351 A1 * 1/2009

* cited by examiner

*Primary Examiner* — Gordon J Stock, Jr.
(74) *Attorney, Agent, or Firm* — Angel N. Gerzhikov; Donna P. Suchy; Daniel M. Barbieri

(57) ABSTRACT

The present disclosure describes an apparatus including a composite panel. The apparatus includes a first composite panel including a first optical fiber embedded therein, the first optical fiber being arranged in a pattern, and a first input port connected to a first end of the first optical fiber, the first input port configured to receive an optical signal from an optical time domain reflectometer. The optical time domain reflectometer is configured to send the optical signal through the first input port and measure a strength of a reflected optical signal that is reflected back from the first optical fiber, wherein the strength indicates a measured optical impedance of the first optical fiber. A measured optical impedance that is substantially the same as a baseline optical impedance for the fiber indicates no damage, while a measured optical impedance that differs from the baseline optical impedance by a predetermined threshold indicates damage.

12 Claims, 7 Drawing Sheets

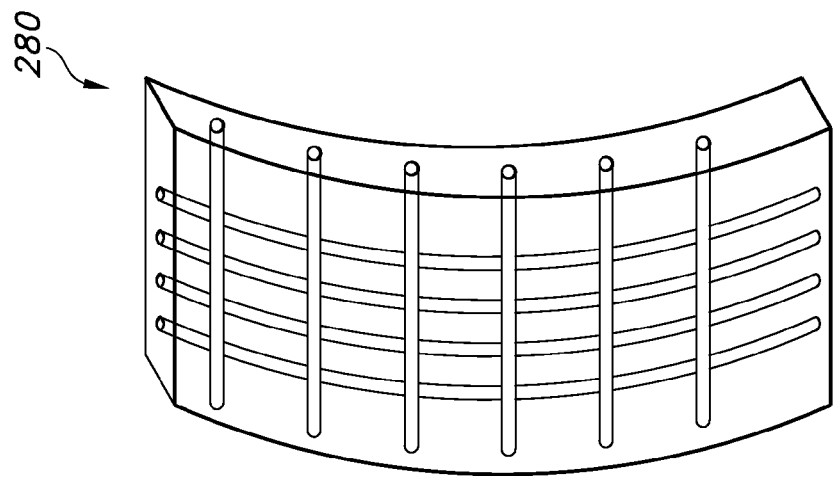
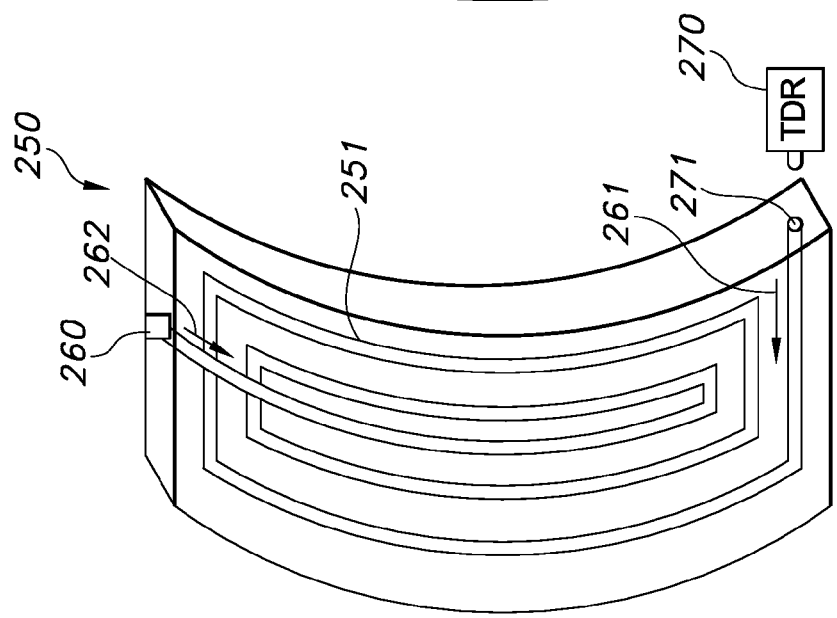
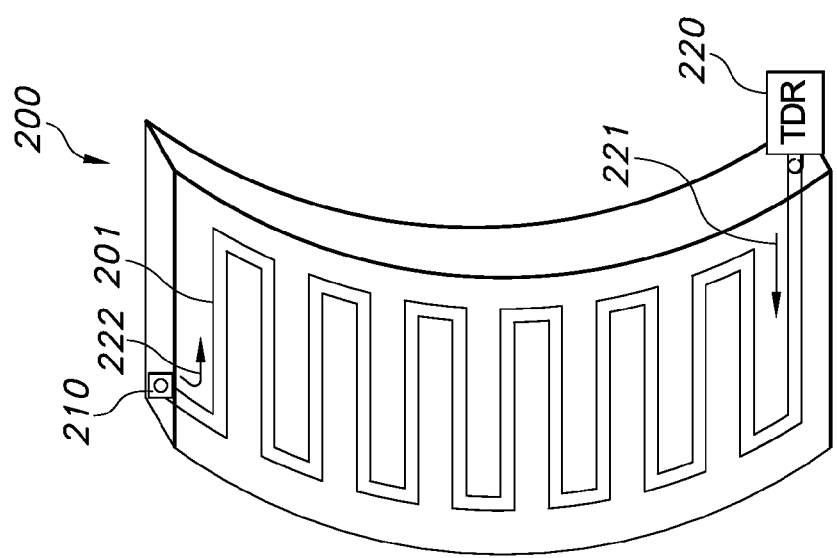

MEANS TO DETECT DAMAGE IN COMPOSITE MATERIAL PANELS

BACKGROUND

Many newer aircraft make extensive use of composite materials to reduce weight. Such composite panels for the skin of aircraft are susceptible to breakage caused by bird strikes, hail, and other debris. In conventional metal panels, such damage is typically readily visible as dents. However, pilots and maintenance crews may not detect the damage of composite panels as readily since composite panels typically spring-back and do not dent. In addition, cracks to composite panels can be difficult to visually detect. This allows the possibility of reduced performance or later catastrophic failure due to an undetected breakage. As such, examining an aircraft made of composite panels for damage is both time consuming and unreliable.

Some conventional techniques for detecting damage in composite materials include several examples of using optical fiber embedded in the composite material. Techniques for using the fiber as a sensor include embedding Bragg cells at intervals along the fiber to reflect laser pulses and laying individual fibers in a grid pattern each terminated by a mirrored surface to isolate damage to a particular row and column of fiber. The former has a granularity dependent upon the spacing of the Bragg cells and includes the extra cost of forming them. The latter has a granularity set by the grid density and will only detect situations in which the damage is severe enough to sever the fiber.

SUMMARY

In view of the foregoing, the present disclosure presents a composite panel embedded with optical fiber and utilizes an optical time domain reflectometer (TDR) to detect any changes in the optical impedance of an optical fiber. If the fiber is embedded close enough to the material surface, this approach is able to not only to detect damage to the composite panel that breaks the fiber but also damage that only pinches, bends, or otherwise disturbs the fiber geometry. One would have the option of switching the TDR among fibers formed into a grid as mention above or to use a single fiber routed to cover the whole surface of a composite component. By knowing the positioning and baseline optical impedance of the fiber in the composite panel, the point of damage can be identified from an optical impedance measurement made by the TDR. Such a system may be self-calibrating by maintaining a baseline against which sudden changes in reflectance can be judged.

The present disclosure describes an apparatus including a composite panel. The apparatus includes a first composite panel including a first optical fiber embedded therein, the first optical fiber being arranged in a pattern, and a first input port connected to a first end of the first optical fiber, the first input port configured to receive an optical signal from an optical time domain reflectometer. The optical time domain reflectometer is configured to send the optical signal through the first input port and measure a strength of a reflected optical signal that is reflected back from the first optical fiber, wherein the strength indicates a measured optical impedance of the first optical fiber. A measured optical impedance that is substantially the same as a baseline optical impedance for the fiber indicates no damage, while a measured optical impedance that differs from the baseline optical impedance by a predetermined threshold indicates damage.

BRIEF SUMMARY OF THE DRAWINGS

FIG. 2a shows a composite panel embedded with optical fiber in a serpentine pattern.

FIG. 2b shows a composite panel embedded with optical fiber in a circular pattern.

FIG. 2c shows a composite panel embedded with optical fiber in a grid pattern.

DETAILED DESCRIPTION

Figure 1:
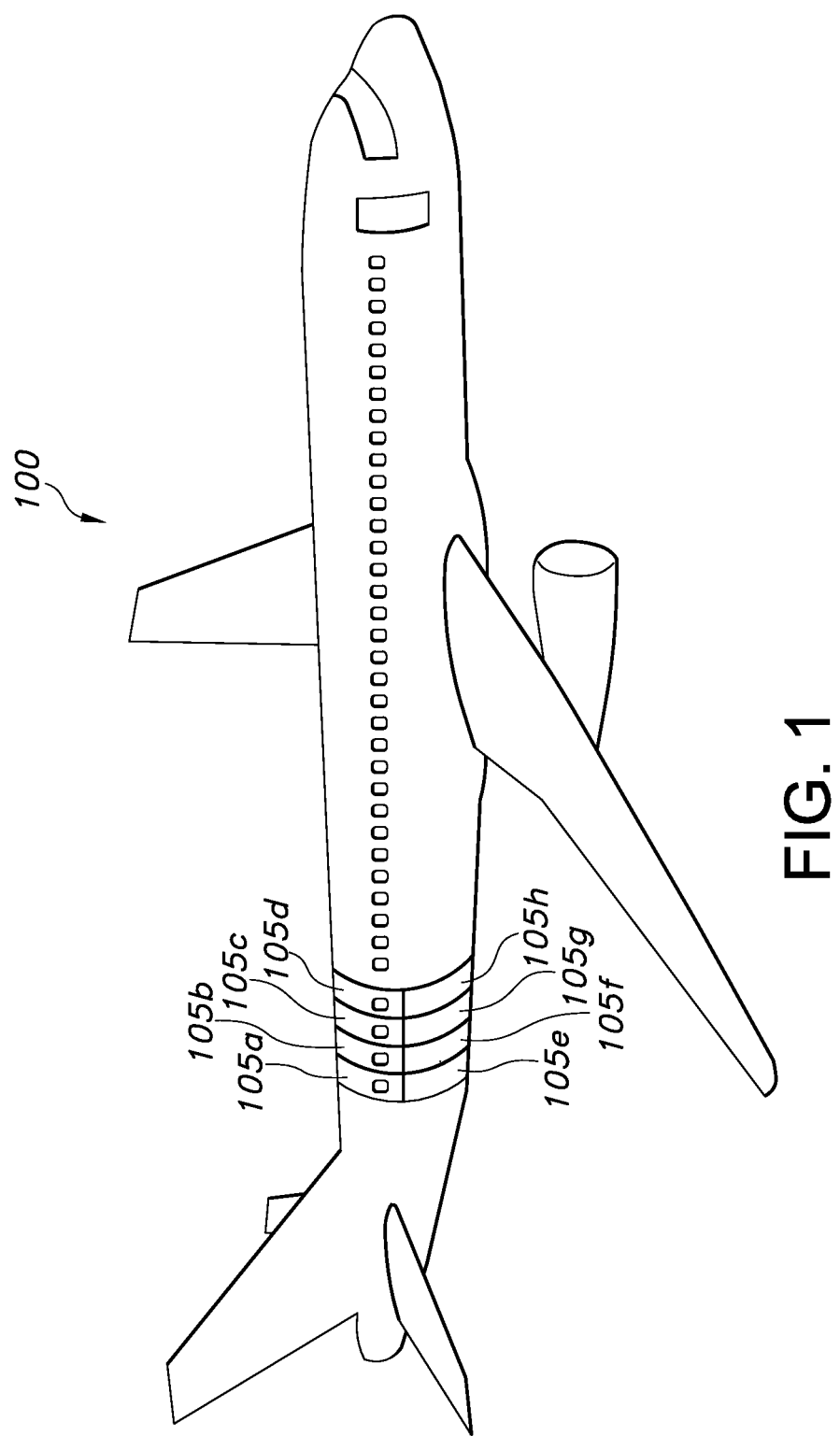
FIG. 1 shows an aircraft consisting of a plurality of composite panels.

FIG. 1 shows an aircraft 100 that has an outer skin consisting of a plurality of composite panels 105a-h. For simplification, only a small section of composite panels that may exist on aircraft 100 are shown. While FIG. 1 is directed at an aircraft implementation, it should be noted that the composite panels and techniques discussed herein may be applicable for any use of composite panels, vehicular or otherwise. As mentioned above, many newer aircraft make extensive use of composite materials to reduce weight. In general, a composite material is any material that is made from two or more materials with significantly different physical or chemical properties. As one example, modern aircraft use a composite material made from carbon fiber embedded in resin. Other examples of composite materials include, but are not limited to, fiberglass or Kevlar embedded in resin, fiber-reinforced polymers (where the fiber may include wood), carbon-fiber reinforced plastic, and glass-reinforced plastic.

FIG. 2a shows a composite panel embedded with an optical fiber according to one embodiment of the disclosure. Composite panel 200 includes an optical fiber 201 that is embedded in the composite panel and arranged in a specific pattern. As shown in FIG. 2a, optical fiber 201 is arranged in a serpentine pattern. Optical fiber 201 may be any gauge of optical fiber that is able to be embedded in the composite panel and that is capable of carrying an optical signal to the end of the optical fiber given the pattern chosen. Preferably, optical fiber 201 is embedded into the composite panel at a depth where damage to the composite panel is reflected to the optical fiber as a break, pinch, bends, kink or other disturbance to the optical fiber geometry. The sensitivity to damage is increased if the depth of the optical fiber is closer to the surface of the panel that may suffer damage. This depth may be anywhere to a few millimeters to the entire thickness of the panel.

One end of the optical fiber may be left as an open end 210. The other end of the optical fiber is connected to an input port that, is configured to receive optical signal 221 from optical time domain reflectometer 220. Optical time domain reflectometer is configured to send an optical signal 221 through optical fiber 201 and measure the strength of any reflected signals coming from the fiber. As the optical fiber shown in FIG. 2a is substantially free of disturbances to its geometry and is left with an open end 210, the majority of any reflected signal 222 would come off normal discontinuities and minor defects experienced in the manufacture of the optical fiber.

Figure 6A:
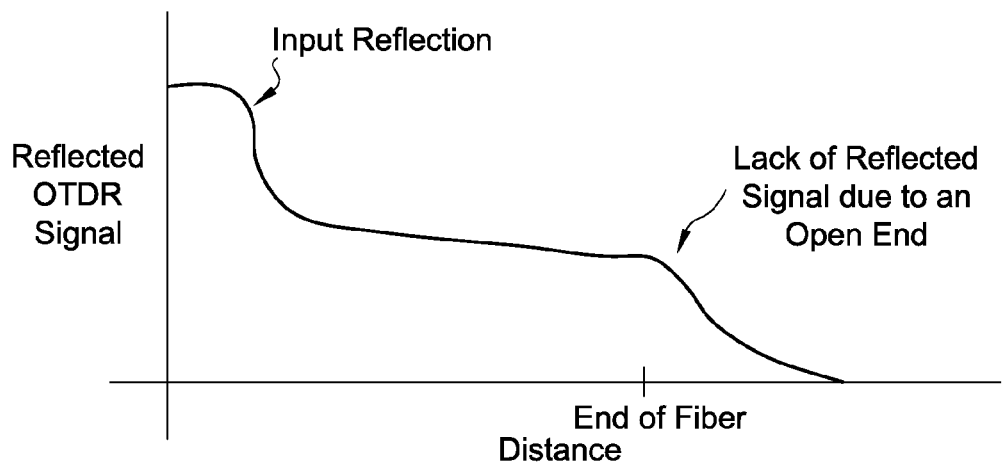
FIG. 6A shows an example of an optical impedance chart of a typical optical fiber with an open end.

The strength of reflected signals received back by optical time domain reflectometer 220 is integrated over a period of time. This integrated strength can then be used to give an indication of the optical impedance of the optical fiber over the length of its distance. FIG. 6A shows an example of an optical impedance chart of a typical optical fiber with an open end as shown in FIG. 2A. As shown in this chart, an input reflection is typically seen toward the beginning length of the fiber due to the connection of the optical time domain reflectometer transmitter. The strength of the reflected signal gradually decreases over the length of the fiber and then dips further at the end of the fiber as the fiber has an open end in this example. An open end would result in fewer signal reflections. If the optical fiber ended in a connection (such as to another optical fiber) or ended with a reflector, the optical impedance chart would be expected to show a stronger reflected signal at the end of the fiber. The chart of optical impedance shown in FIG. 6A may be thought of as the baseline impedance of the optical fiber 201 in FIG. 2A. This baseline optical impedance may be measured against future measurements of optical impedance to determine if there is damage to the fiber, and thus by inference, damage to the composite panel.

Figure 3B:
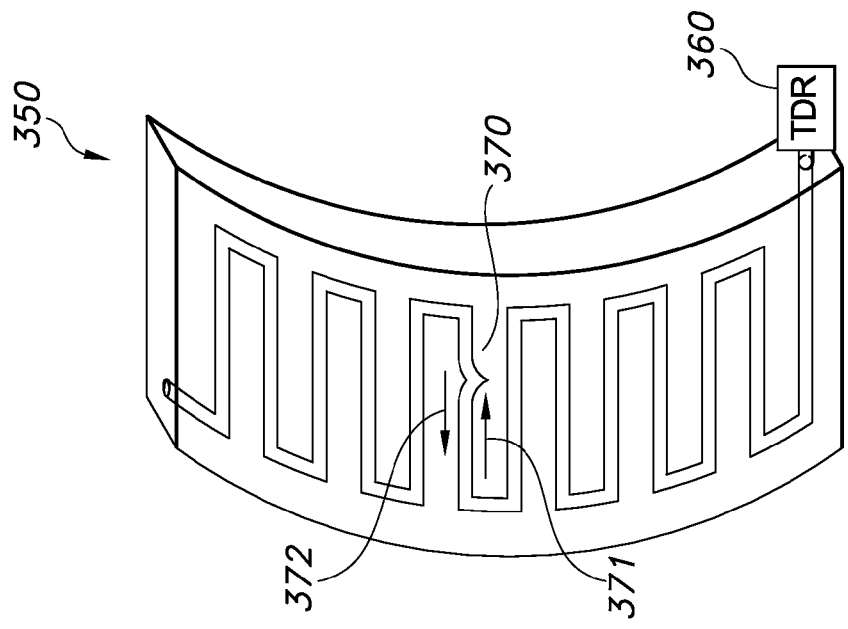
FIG. 3b shows a composite panel embedded with optical fiber that has been kinked.
Figure 6B:
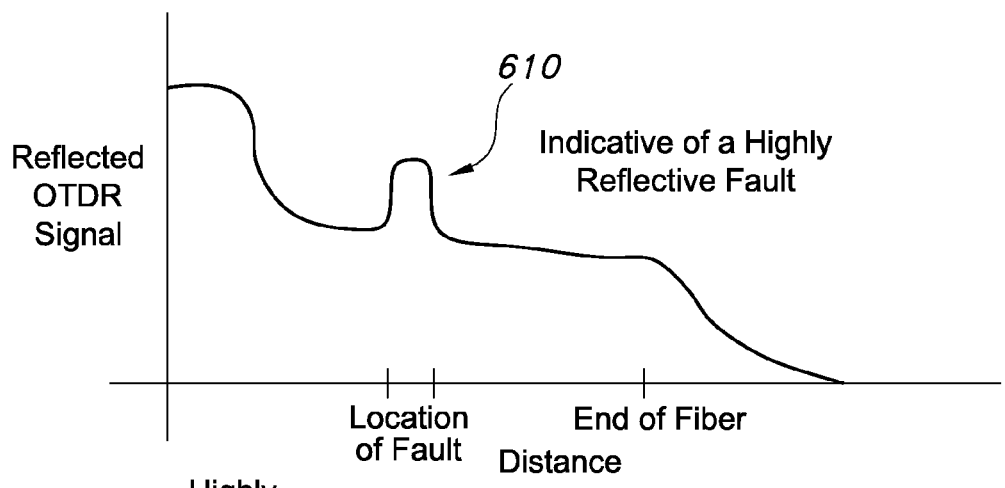
FIG. 6B shows an example of a chart of the optical impedance of a fiber that has developed a highly reflective fault.

FIG. 6B shows an example of a chart of the optical impedance of a fiber that has developed a highly reflective fault, such as a kink. An example, of a fiber with a kink is shown in FIG. 3B. As seen in the chart, there is a spike 610 in reflected signal strength between the beginning and end of the fiber. This spike suggests a highly reflective fault such as a kink, bend, or other discontinuity in the fiber that causes signal to be reflected back to the optical time domain reflectometer. The optical impedance chart of FIG. 6B could then be compared to the baseline optical impedance chart in FIG. 6A to show that the impedance of the optical fiber has changed. This optical impedance change would also show the distance from the beginning of the fiber where the fault is located. As such, by knowing the length and pattern of the fiber, the point on the fiber at which the optical impedance has changed would also indicate where on the composite panel damage is believed to exist.

It would be preferable to set a threshold for the amount of change necessary to signify that the change in impedance measured is actually due to damage to the panel. It is foreseeable that changes in optical impedance of the fiber may be due to typical environmental conditions and do not actually indicate any damage. The threshold chosen to actually signify damage may be chosen such that a desired level of sensitivity is achieved. The lower the threshold of optical impedance change, the higher the sensitivity.

Figure 6C:
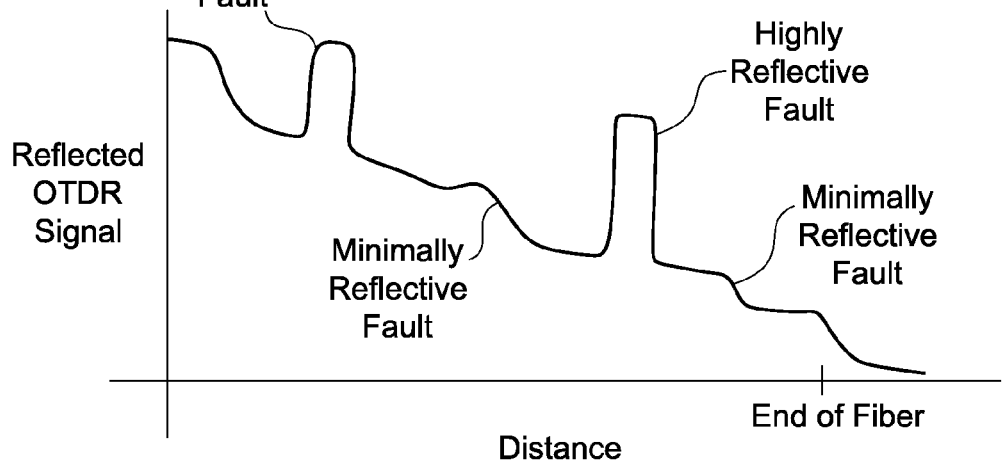
FIG. 6C shows another example of a chart of measured optical impedance indicating multiple faults.

FIG. 6C shows another example of a chart of measured optical impedance with multiple faults, including highly reflective faults (e.g., bends, kinks, discontinuities) and minimally reflective faults (e.g., a break in the fiber). As can be seen in the FIG. 6C, multiple highly reflective and minimally reflective faults may be discovered by an optical time domain reflectometer in a single measurement. As such, a single measurement of optical impedance may be used to locate multiple damage locations on a composite panel.

Returning to FIG. 2a, optical time domain reflectometer 220 in this example is affixed to composite panel 200. FIG. 2b, shows an alternative embodiment where optical time domain reflectometer 270 is configured to be detachably affixble to composite panel 250. That is, rather than designing each panel with its own optical time domain reflectometer, a single reflectometer may be used to discretely check each panel manually. FIG. 2b also shows an alternative circular pattern for optical fiber 251. Again, optical time domain reflectometer 270 sends optical signal 261 through input 271 and receives back reflected signal 262, which may be substantially reflected off of reflector 260. FIG. 2c shows another alternative pattern for arranging the optical fibers. In this case, composite panel 280 has multiple optical fibers arranged in a grid pattern, each with their own input ports and reflectors. Such a pattern may provide better precision and localization of damage detection at the expense of increased complexity.

Figure 3A:
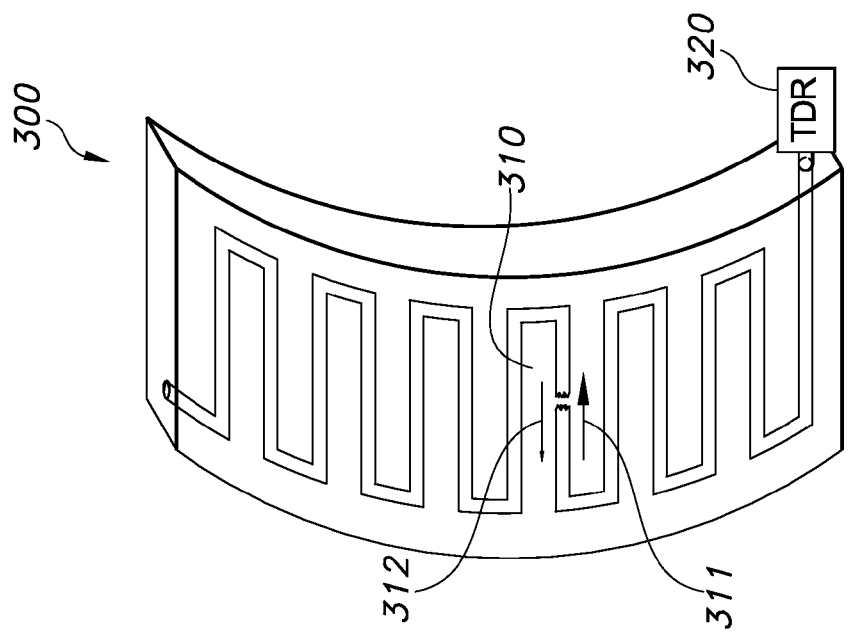
FIG. 3a shows a composite panel embedded with optical fiber that has been broken.

FIG. 3a shows a composite panel 300 embedded with optical fiber 310 that has been broken. As shown in this example, the optical signal 311 produced by optical time domain reflectometer 320 is not substantially reflected at the break. Since the strength of reflected signal 312 would be lower than that of a baseline optical impedance reading for the same fiber, a comparison of the baseline optical impedance and the measured optical impedance would indicate a minimally reflective fault at that location of the fiber. This location of the minimally reflective fault would give an indication of the location of damage to the composite panel.

Similarly, FIG. 3b shows a composite panel 350 embedded with optical fiber 370 that has been kinked. As shown in this example, the optical signal 371 produced by optical time domain reflectometer 360 is substantially reflected at the kink. Again, since the strength of reflected signal 312 at that location of the fiber would be substantially higher than the baseline impedance of the same fiber at that location, a comparison of the baseline optical impedance and the measured optical impedance would indicate a highly reflective fault at that location of the fiber. This location of the highly reflective fault would give an indication of the location of damage to the composite panel.

Figure 4:
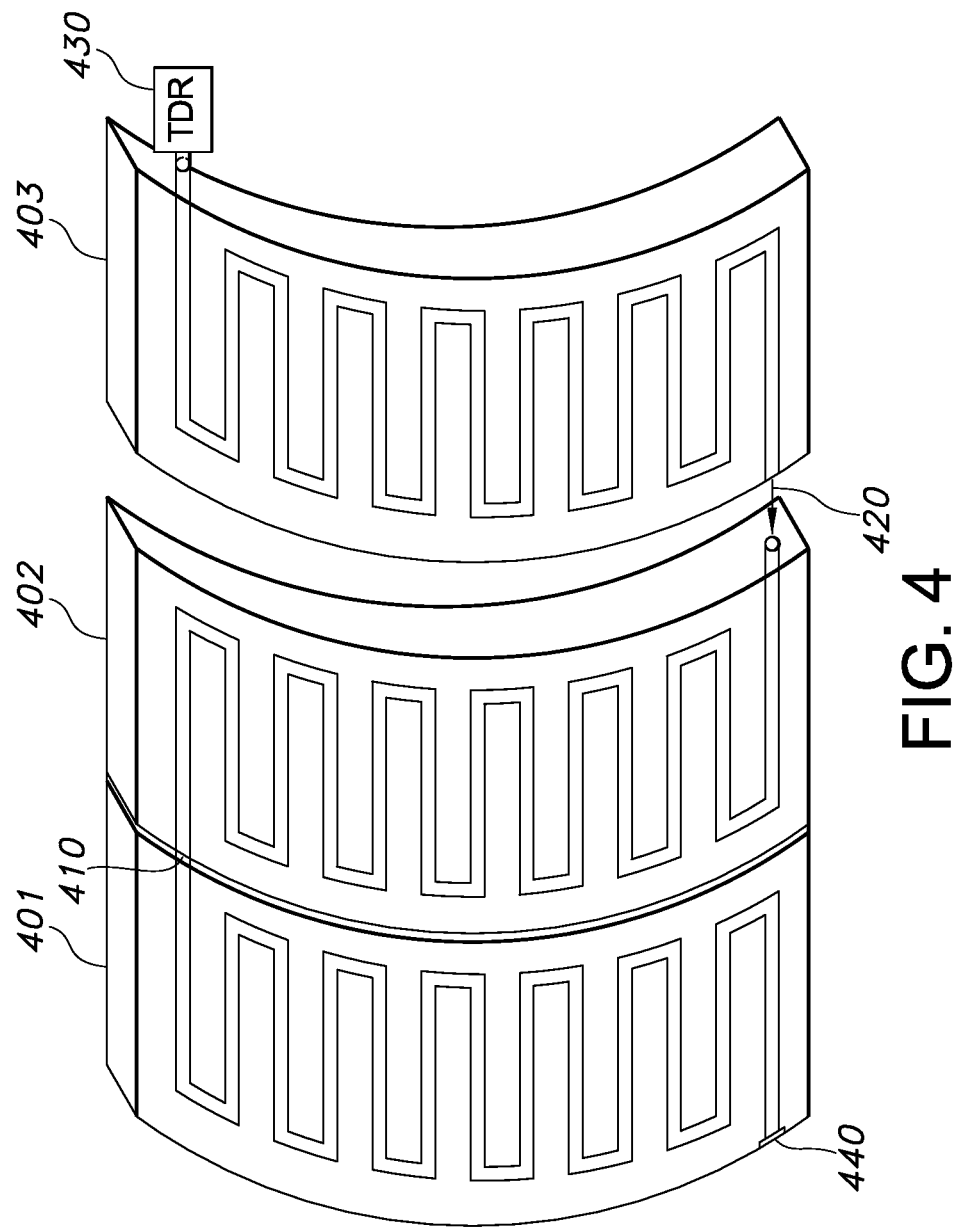
FIG. 4 show multiple composite panels embedded with optical fiber connected together in series.

FIG. 4 shows an example where the optical fibers of two or more panels are connected together. In order to conserve the number of optical time domain reflectometers used and the amount of measurements taken, panels 401, 402, and 403 may connected together in such a way that their embedded optical fibers also connect together with optical continuity. As shown in FIG. 4, composite panel 401 includes an optical fiber that has a reflector 440 at one end and connects to the optical fiber of composite panel 402 at input port 420. Similarly, the optical fiber of composite panel 402 connects to the optical fiber of composite panel 403 at input 420. Optical time domain reflectometer may than be attached to the opposite end of the optical fiber in panel 403. This arrangement has the advantage of using only one reflectometer for three panels.

Figure 7:
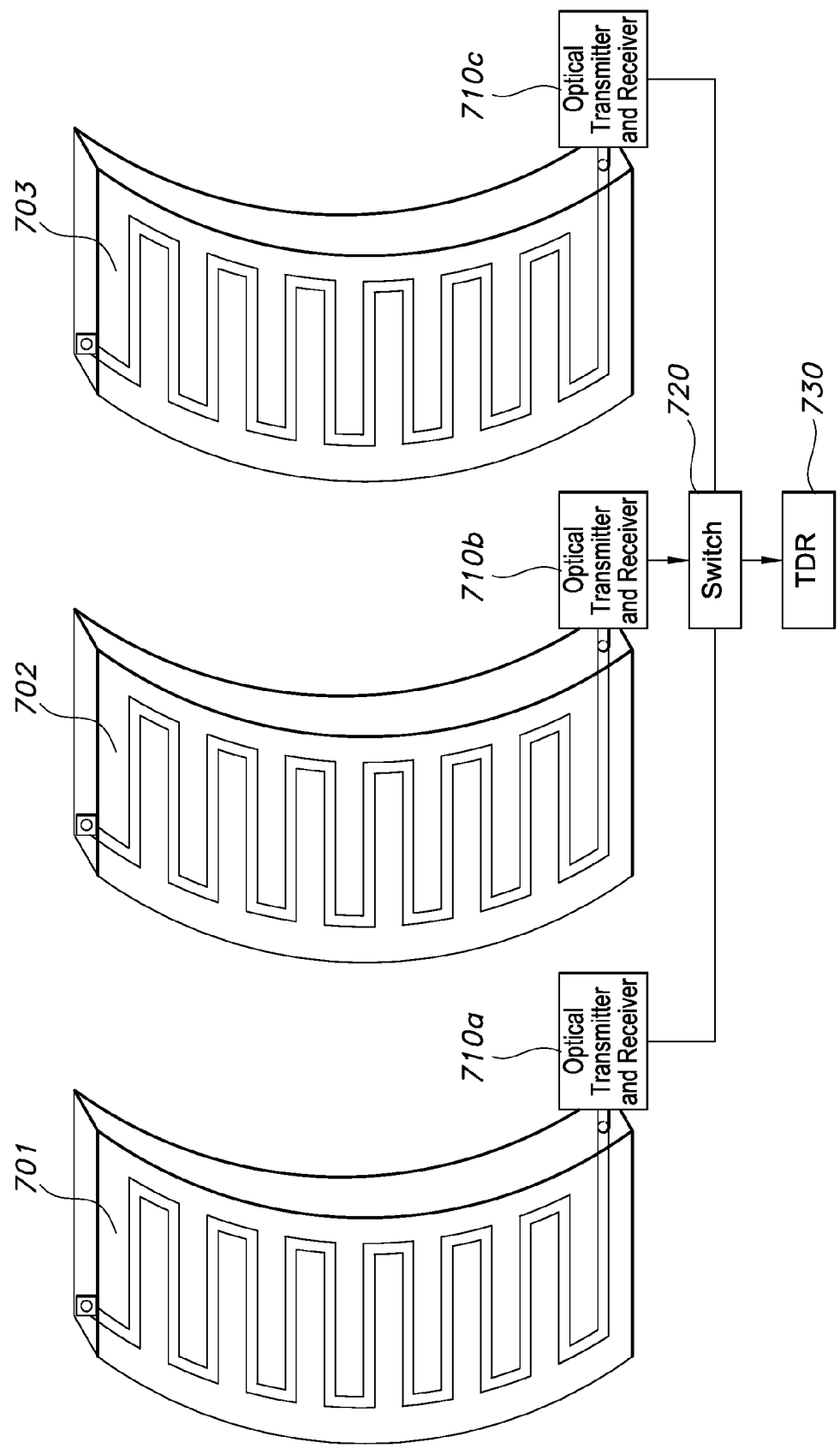
FIG. 7 shows multiple composite panels embedded with optical fiber connected together in parallel.

FIG. 7 shows another example of a configuration where the number of optical time domain reflectometers may be conserved. In this example, composite panels 701-703 are not affixed to their own optical time domain reflectometer. Instead, the panels are affixed with optical transmitters and receivers 710a-c. As an example, the optical transmitter may be an LED or a laser, however any type of optical transmitter suitable for transmitting a signal along an optical fiber may be used. The optical receiver may be any type of circuit suitable for detecting a reflected signal from an optical fiber, such as a photodiode. Optical time domain reflectometer 730 may be configured to sequentially control the transmission and reception of optical transmitter and receiver 710a-c through a switch 720. In this scenario, the transmission and reception of the optical signal is distributed through each of a group of panels, while the measurement of the reflected signal strength and calculation of the optical impedance of the fiber over distance is handled by a single optical time domain reflectometer for that group of panels. Essentially, FIG. 7 shows composite panels whose optical fibers are connected to an optical time domain reflectometer in parallel.

Figure 5:
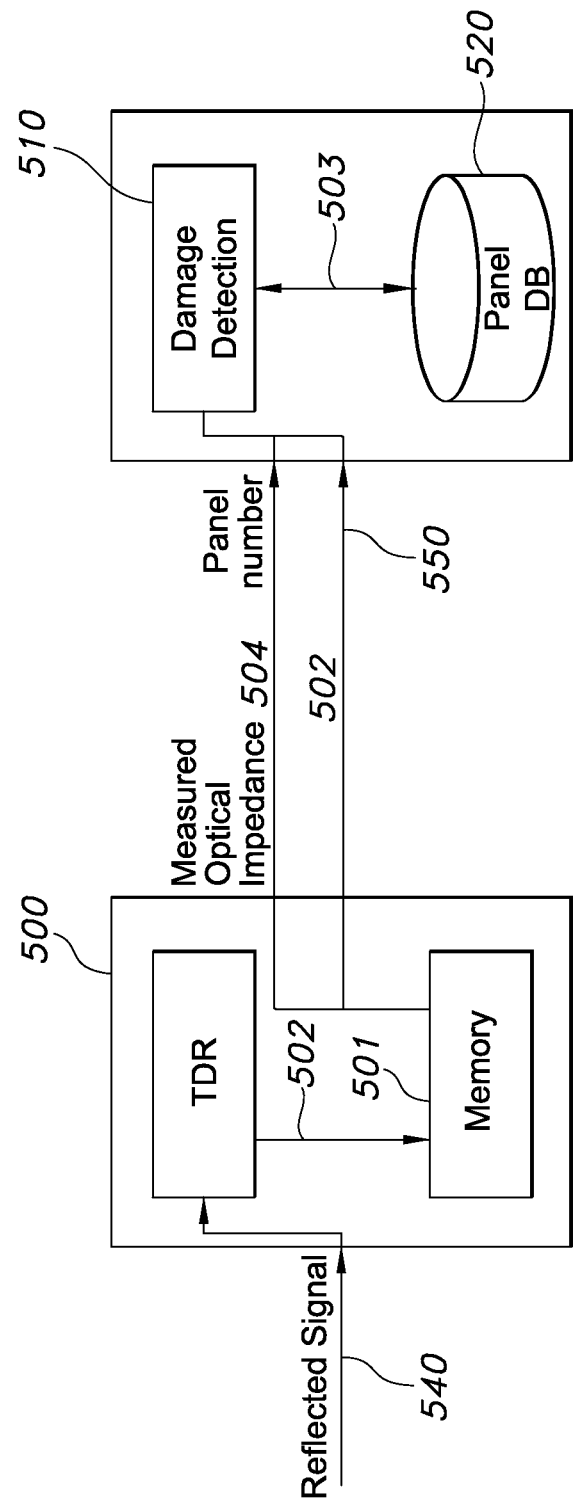
FIG. 5 shows a block diagram of a optical time domain reflectometer and a damage detector.

FIG. 5 shows a block diagram of an optical time domain reflectometer and a damage detector according to one embodiment of the disclosure. Optical time domain reflectometer 500 receives reflected signal 540 back from the optical fiber and integrates the strength of that signal over time. This integrated strength is then converted to a measured optical impedance 502 of the optical fiber over its length the measured optical impedance is stored in memory 501. At some time after that calculation, whether it be immediately, periodically, or manually, measured optical impedance 502 and some form of panel number 504 which identifies the panel from which optical impedance was measured is communicated over communication link 550 to damage detector 510. Communication link 550 may be any type of communication link, including wired and wireless links. In addition, damage detector 510 may be a discrete component from optical time domain reflectometer 500, or may be contained within the same housing.

Damage detector 510 than uses the panel number 504 to look up a baseline optical impedance 503 of the optical fiber in that panel from a panel database 520. The baseline optical impedance is than compared to the measured optical impedance to determine if that panel has suffered any damage and where that damage of located on the panel based on the length and pattern of the optical fiber. The operation of damage detector 510 may be carried out by an ASIC, FPGA, dedicated hardware, firmware, or software running on a microprocessor.

What is claimed is:

1. An apparatus comprising:
   a plurality of panels; comprising:
      a first composite panel including a first optical fiber embedded therein, the first optical fiber being arranged in a first pattern; and
      a second composite panel including a second optical fiber embedded therein, the second optical fiber being arranged in a second pattern; and
   means for detecting continuously along the extent of at least said first optical fiber and said second optical fiber, an existence of and a location of physical impact caused broken or kinked portions of one of said first optical fiber and said second optical fiber, comprising:
   a time domain reflectometer;
   a switch coupled to said time domain reflectometer;
   one or more optical transmitters and receivers coupled to said switch;
   a first input port connected to a first end of the first optical fiber, the first input port configured to receive an optical signal from one of the one or more optical transmitters and receivers;
   a second input port configured to connect to a first end of the second optical fiber and another one of the one or more optical transmitters and receivers; and
   a first reflector connected to a second end of the first optical fiber.

2. The apparatus of claim 1, wherein the first pattern is a serpentine pattern.

3. The apparatus of claim 1, wherein the second pattern is a circular pattern.

4. The apparatus of claim 1, wherein the first pattern is a grid pattern.

5. The apparatus of claim 1, further comprising a third composite panel including a third optical fiber embedded therein, the third optical fiber being arranged in a third pattern.

6. The apparatus of claim 5, wherein the time domain reflectometer is configured to send the optical signal through the first input port and measure a strength of a reflected optical signal that is reflected back from the first optical fiber, wherein the strength of the reflected optical signal indicates a measured breakage or kinking characteristic of said first optical fiber.

7. The apparatus of claim 6, wherein the measured breakage or kinking characteristic is compared to a baseline breakage or kinking characteristic of the first optical fiber to determine damage.

8. The apparatus of claim 6, wherein the time domain reflectometer includes a memory configured to store a measured optical impedance.

9. The apparatus of claim 7, wherein a measured breakage or kinking characteristic that is substantially the same as the baseline breakage or kinking characteristic indicates no damage, and wherein a measured breakage or kinking characteristic that differs from the baseline breakage or kinking characteristic by a predetermined threshold indicates damage.

10. The apparatus of claim 8, further comprising:
    a damage detector configured to receive a measured optical impedance from the optical time domain reflectometer; and
    a database storing at least a baseline optical impedance of the first optical fiber,
    wherein the damage detector compares the measured optical impedance to the baseline optical impedance of the first optical fiber to determine if damage exists.

11. The apparatus of claim 10, wherein the time domain reflectometer, the damage detector, and the database are contained within a common housing.

12. An apparatus comprising:
    a first composite panel including a first optical fiber embedded therein, the first optical fiber being arranged in a pattern;
    a first input port connected to a first end of the first optical fiber, the first input port configured to receive an optical signal;
    a first optical transmitter and receiver connected to the first input port;
    a second composite panel including a second optical fiber embedded therein, the second optical fiber being arranged in a pattern; and
    a second input port connected to a first end of the second optical fiber, the second input port configured to receive an optical signal;
    a second optical transmitter and receiver connected to the second input port;
    an optical time domain reflectometer connected to the first optical transmitter and receiver;
    wherein the optical time domain reflectometer is connected to the first optical transmitter and receiver through a switch; and
    wherein the optical time domain reflectometer is configured to control the operation of the first optical transmitter and receiver and the second optical transmitter and receiver sequentially, and is further configured to measure a strength of a reflected optical signal that is reflected back from the first optical fiber and the second optical fiber, wherein the strength of the reflected optical signal indicates a measured physical impact induced breakage or kinking characteristic of the first optical fiber and the second optical fiber, at any location along said first optical fiber and said second optical fiber.

* * * * *